(12) United States Patent
Autret et al.

(10) Patent No.: US 6,229,242 B1
(45) Date of Patent: *May 8, 2001

(54) CASE FOR ELECTRIC MOTOR BRUSHES COMPRISING COOLING FINS

(75) Inventors: Alain Autret, Guyancourt; Blaise Rouleau, Paris; Abdou Salembere, Compiegne, all of (FR)

(73) Assignee: Valeo Systemes d'Essuvage, La Verriere (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/086,195

(22) Filed: May 28, 1998

(30) Foreign Application Priority Data

May 30, 1997 (FR) .................................................. 97 06708

(51) Int. Cl.⁷ ................................ H02K 5/14; H02K 5/18
(52) U.S. Cl. ............................................. 310/239; 310/64
(58) Field of Search ...................................... 310/239, 64

(56) References Cited

U.S. PATENT DOCUMENTS

| 1,469,720 | * | 10/1923 | Dorsey | 310/239 |
| 2,275,613 | * | 3/1942 | Cullin | 310/239 |
| 3,127,533 | * | 3/1964 | Gardner, Jr. | 310/239 |
| 4,785,214 | * | 11/1988 | Mummert | 310/241 |
| 4,990,811 | * | 2/1991 | Nakata et al. | 310/239 |
| 5,397,952 | | 3/1995 | Decker et al. | 310/242 |
| 5,495,134 | * | 2/1996 | Rosenblum | 310/239 |
| 5,949,175 | * | 9/1999 | Cummins | 310/239 |

FOREIGN PATENT DOCUMENTS

| 0 418 135 | | 3/1991 | (EP) . | |
| 0 615 316 | | 9/1994 | (EP) . | |
| 2 427 711 | | 12/1979 | (FR) . | |
| 2 459 571 | | 1/1981 | (FR) . | |
| 2486323 | * | 1/1982 | (FR) | 310/239 |
| 2 699 749 | | 6/1994 | (FR) . | |
| 2 022 932 | | 12/1979 | (GB) . | |
| 2 057 198 | | 3/1981 | (GB) . | |
| 2 191 346 | | 12/1987 | (GB) . | |
| 1-97151 | * | 4/1989 | (JP) | 310/239 |
| 52-122803 | * | 10/1997 | (JP) | 310/239 |

OTHER PUBLICATIONS

French Search Report dated Feb. 20, 1998.

* cited by examiner

Primary Examiner—Karl Tamai
(74) Attorney, Agent, or Firm—Morgan & Finnegan LLP

(57) ABSTRACT

The case for an electric motor brush defines a housing for a brush and comprises a cooling fin. The case comprises a flat metal base plate and a cover plate formed by separate pieces and defining the housing.

21 Claims, 2 Drawing Sheets

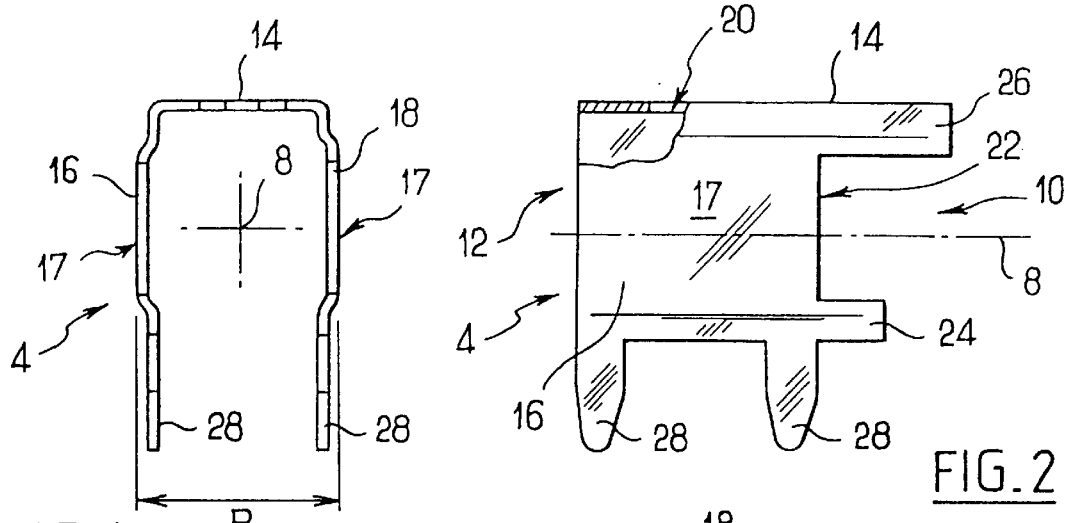
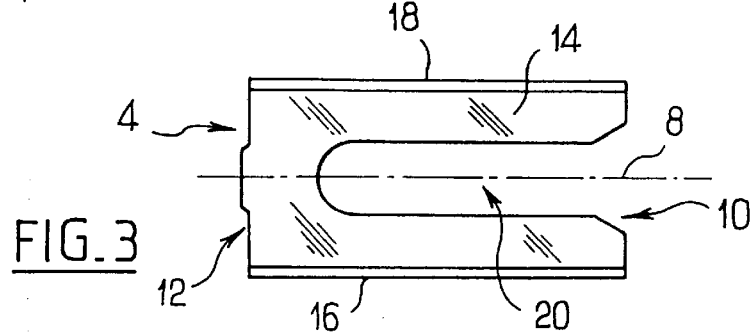
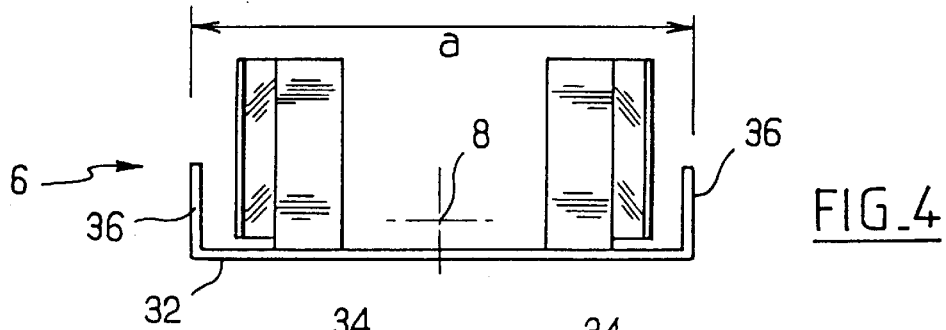
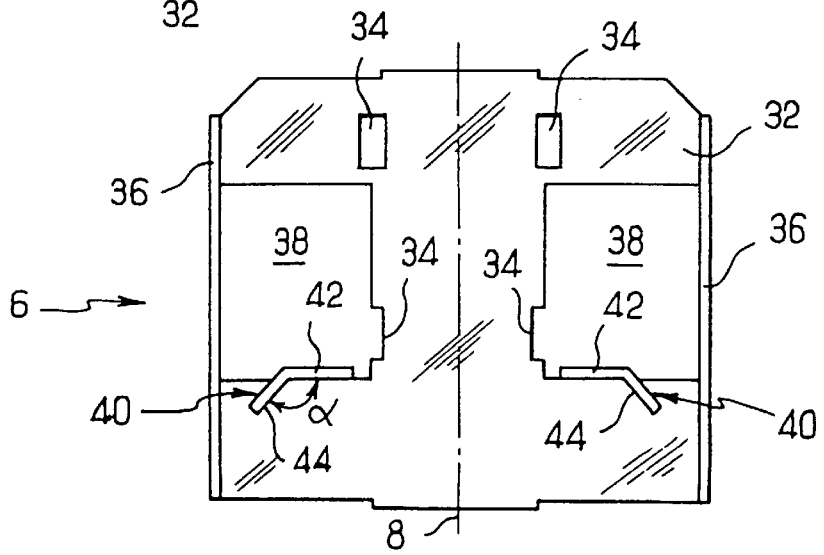

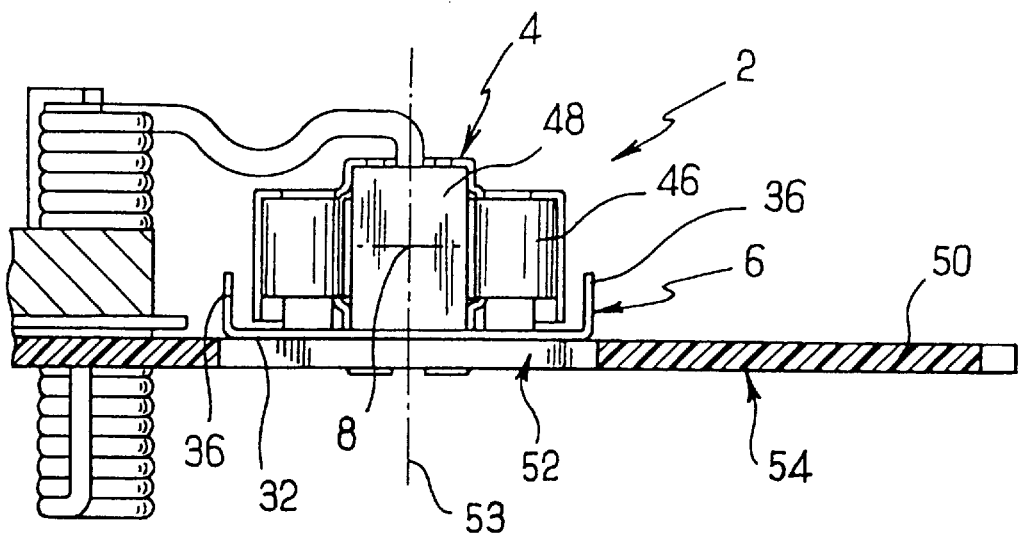
FIG_6
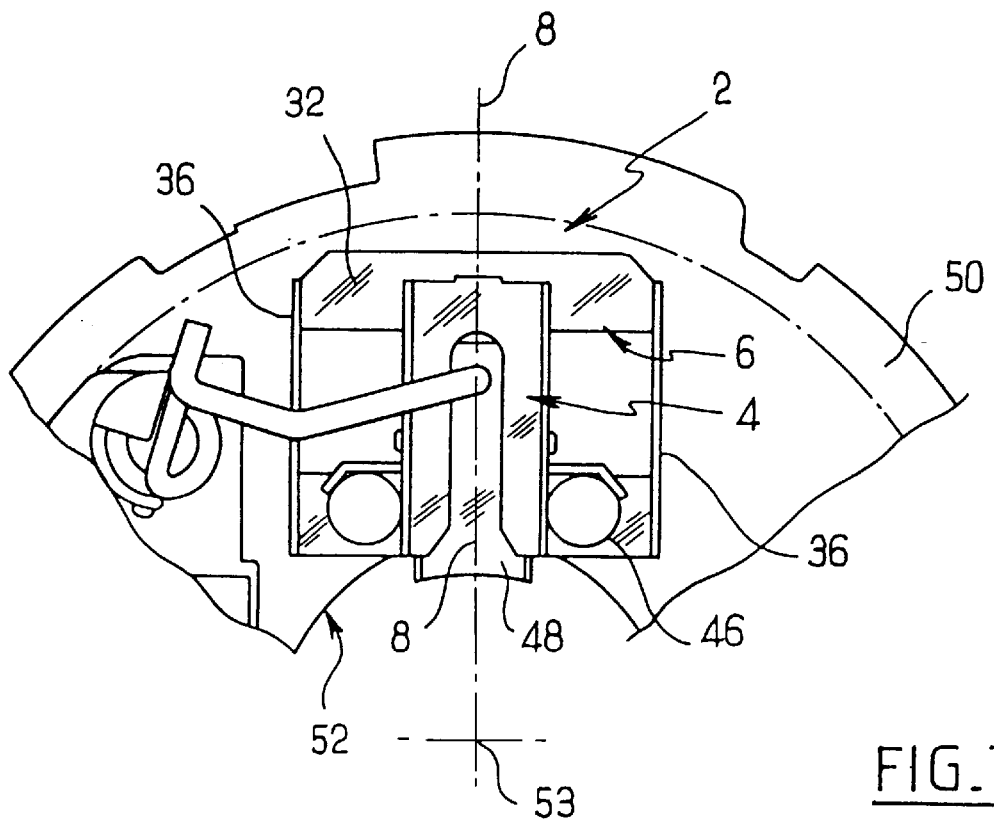
FIG_7

CASE FOR ELECTRIC MOTOR BRUSHES COMPRISING COOLING FINS

FIELD OF THE INVENTION

The invention relates to cases for electric motor brushes to sub-assemblies for electric motors comprising such cases and to electric motors comprising such cases.

BACKGROUND OF THE INVENTION

There is known, from French patent application number 2 699 749A, a brush case made by bending a metal blank defining a housing for guiding a brush in a sliding manner, and comprising cooling fins extending to the top of the case. The fins are shaped and disposed to have a large contact surface with the case and to offer a large exchange surface by convection with the ambient air. However, this case has the drawback that the bending of the blank for the manufacture of the case is complicated to perform. Moreover, the possibilities for shaping and arranging the fins remain limited and do not enable good cooling performances to be obtained.

One object of the invention is to provide a case which is easier to manufacture and which offers more possibilities and at least one cooling fin, arranged with improved cooling performance.

SUMMARY OF THE INVENTION

In accordance with the, there is provided a case for an electric motor brush defining a housing for a brush and comprising a cooling fin, a flat metal base plate and a cover plate, the base plate and cover plate being formed by separate pieces defining the housing.

Thus, the cover plate and the base plate are produced separately, which facilitates the manufacture of the case. Moreover, this separate design offers great freedom as to shape and arrangement of the fin to optimize the cooling performances.

Advantageously, the base plate has a dimension in the transversal direction perpendicular to an axial direction of the cover plate which is at least equal to twice a larger dimension of the cover plate in the transverse direction.

Thus the base plate itself offers a large heat exchange surface by convection with the ambient air.

The fin advantageously extends from the base plate.

The fin advantageously extends in a plane parallel to an axial direction of the cover plate.

The fin advantageously extends in a plane perpendicular to the base plate.

The case advantageously comprising a stop lug fixed to the base plate and extending in a plane that is not parallel to an axial direction of the cover plate. Thus this lug offers a stop to secure an end of a band spring coiled thereon ensuring the return of the brush towards a commutator of the motor.

The stop lug advantageously has two plane faces not parallel to an axial direction of the cover plate and forming an obtuse angle between such faces. Thus, the lug ensures good positioning of the coiled end of the band spring.

The stop lug is advantageously in a single piece with the base plate.

The cover plate advantageously comprises two lateral walls suitable for extending perpendicularly to the base plate and having cut-outs extending from one axial end of the cover plate.

Thus, these cut-outs allow the passage of the band spring.

Also provided in accordance with the invention is a for an electric motor comprising a case, a brush suitable to be received slidingly in the case and a band spring for the return of the brush, the case comprises a cooling fin, the a flat metal base plate and a cover plate, the base plate and cover plate being formed by separate pieces defining the housing.

There may be provided a brush unit comprising a case and a brush, or a plate bearing several brush units of this type.

Furthermore according to the invention an electric motor is provided comprising a case which comprises a cooling fin, a flat metal base plate and a cover plate, the base plate and cover plate being formed by separate pieces defining the housing.

Other characteristics and advantages of the invention will become further apparent in the following description of a preferred embodiment given by way of a non-restrictive example.

BRIEF DESCRIPTION OF THE DRAWINGS

In the attached drawings:

FIGS. 1, 2 and 3 are a front view, a view and a top view, respectively of a cover plate of a case according to an embodiment of the invention;

FIGS. 4 and 5 are respective front and top views of a base plate intended to be associated with the cover plate of FIG. 1; and FIGS. 6 and 7 are respective partial cross-sectional and top views of a brush-holder plate bearing a case comprising the cover plate of FIG. 1 and the base plate of FIG. 4.

DESCRIPTION OF THE PREFERRED EMBODIMENT

With reference to FIGS. 1 to 5, a case 2 for the electric motor brush according to the invention comprises a cover plate 4 and a base plate part 6, both made of metal, here made of brass. The cover plate 4 and the base plate part 6 are each a single piece and produced by cutting and bending two respective blanks made of brass. The cover plate 4 will be described first.

The cover plate 4 has the general shape of a rectangle parallelepiped. It has an axial direction 8 defining a front axial end 10 and a rear axial end 12 of the cover plate. The cover plate 4 is profiled in this direction. The cover plate comprises an upper wall 14 and two lateral walls, left and right wall 16, 18. The vertical and horizontal directions, shown in FIGS. 1, 2 and 4, are used only for the purposes of description.

It is obvious that any desired orientation may be used for the case 2 in the motor. The upper wall 14, left wall 16 and right wall 18 each have a general rectangular shape. The two lateral walls 16, 18 extend parallel to one another facing one another and perpendicularly to the upper wall 14.

The upper wall 14 has a cut-out 20 extending from the front axial end 10 parallel to the axis 8, for the passage of a connecting strand of the brush fixed thereto.

The lateral walls 16, 18 each have a bulging portion 20 oriented towards the outside of the cover plate, so that in cross section, a central portion 17 having a rectilinear profile of these walls is distant from the axis 8 of the cover plate. Each lateral wall 16, 18 has a cut-out 22 extending from the front axial end 10 of the cover plate and breaking off before the mid-distance between the two axial ends of the cover plate. These cut-outs 22 are suitable to receive a return band spring as will shown further on. The bulging portions 17 allow, in the cover plate 4, the volumes necessary for positioning the spring. They also improve the cooling of the brush received in the cover plate 4.

The lateral walls 16, 18 have a bottom zone 24 defining a lower horizontal side of the cut-out 22. This bottom zone 24 is shorter along the axis 8 than an upper zone 26 of these walls which is adjacent to the upper wall, 14. Each lateral wall 16, 18 bears two attachment lugs 28 extending perpendicularly to the axis 8 from a lower horizontal side of the wall for the purpose of fixing the cover plate 4 to the base plate 6, and the case 2 to a brush-holder plate.

With reference to FIGS. 4 and 5, the base plate part 6 comprises a flat base plate 32 having a general rectangular shape in plane view. In a central zone the base plate 32 has four rectangular through-orifices 34 suitable for receiving the four lugs 28 respectively of the cover plate 4. The four orifices 34 are disposed symmetrically on either side of a median axial direction 8 of the base plate part 6. The base plate part 6 comprises two flat fins 36 extending perpendicularly to the base plate 32 and parallel to the axis 8, from two opposite sides of the base plate 32 which are parallel to one another. The two fins 36 extend facing one another and parallel to one another. Each fin 36 extends over the entire lengths of the associated side of the base plate 32.

The base plate 6 has two apertures 38 having a general rectangular shape in plane view, having one side respectively adjacent to the fins 36, the apertures being disposed symmetrically to one another with respect to the axis 8. Two of the orifices 34 open into the associated apertures 38. The base plate part 6 comprises two stop lugs 40 in a single piece with the base plate. Each lug 40 comprises a wall 42 extending from a front transversal edge of a respective aperture 38, while being perpendicular to the axis 8 and to the base plate 32. The lug 40 further includes wall 44 perpendicular to the base plate 32, inclined with respect to the axis 8 towards it and having a vertical side in common with the wall 42. The two walls 42, 44 are disposed so that they have two faces defining an obtuse angle α. The two lugs 40 are produced by cutting in the associated apertures 38, then bending. The cover plate 4 has a plane of symmetry passing through the axis 8. The same applies to the base plate part 6.

With reference to FIGS. 6 and 7, to produce a brush-holder plate 50, a brush unit is manufactured in the following manner: A cover plate 4 and a base plate part 6 are produced by cutting and bending. The cover plate 4 is then fixed to the base plate part 6 by introducing the attachment lugs 28 into the orifices 34 of the base plate 32. The cover plate 4 and the base plate 32, thus, define a housing in which it is possible for the brush 48 to be slidingly movable. Then a band spring 46 is introduced into the cut-outs 22 so that the two coiled ends of the spring come to abut against the above-mentioned faces of the respective stop lugs 40. Then a brush 48 is engaged in the cover plate 4 by the front axial end 10 by pushing the median portion of the spring 46 into the cover plate.

Then a support plate 50 is provided, here made of bakelite with a flat circular shape and having a circular orifice 52 in its center. The plate is intended to bear several cases 2 such as those described above. Each case 2 is fixed to the support plate so that its axis 8 is radial to an axis 53 of the orifice 52 of the support plate. The front edge of the upper wall 14 of the cover plate 4 extends to the right of the edge of the orifice 52. The base zone 24 of the lateral walls 16, 18 is therefore recessed from the orifice 52. The attachment lugs 28 penetrate into the through-orifices of the plate intended for this purpose and emerge projecting from a face 54 of the plate opposite the case. The base plate 32 produces a surface-to-surface contact with the plate.

The fins 36 extend facing and at a distance from the respective lateral walls 16, 18 of the cover plate, parallel thereto. The base plate 32 and the fins 36 act as a heat sink and ensure the cooling of the case 2, which is heated by the brush 48, by air convection. The case 2 thus offers a large heat exchange surface with the ambient air. The base plate part 6 has a larger dimension a (or width) in a direction perpendicular to the axis 8 and parallel to the base plate 32, at the level of the fins 36. The cover plate 4 has a larger dimension p (or width) in the same direction, i.e. in a direction perpendicular to the axis 8 and parallel to the upper wall 14. Here, the dimension a is roughly three times the dimension p.

In this particular instance, the support or brush-holder plate 50 is intended to form part of an electric motor for a motor vehicle such as a geared wiper motor, a cooling motor or a window-crank motor.

Of course, a number of modifications may be made to the invention without departing from the scope of the appended claims. The stop lugs 40 for the coiled ends of the band-spring 46 can be connected to the fins 36 by being produced by cutting and bending them.

What we claim is:

1. An electric motor brush holder connectable to a support member, the brush holder comprising:

a metal base plate formed from a unitary metal sheet having at least one folded portion forming a cooling fin; and a cover plate, the metal base plate and the cover plate being separate pieces defining a chamber for holding a brush when the base plate and the cover plate are engaged, wherein the cooling fin is a folded portion of the base plate not defining the chamber.

2. The brush holder of claim 1, wherein the cover plate has an axial direction and wherein the base plate has a dimension in a transversal direction perpendicular to the axial direction of the cover plate, the dimension of the base plate being at least equal to twice a larger dimension of the cover plate.

3. The brush holder of claim 1, wherein the fin extends from the base plate.

4. The brush holder of claim 1, wherein the fin extends in a plane parallel to an axial direction of the cover plate.

5. The brush holder of claim 1, wherein the fin extends in a plane perpendicular to the base plate.

6. The brush holder of claim 1, further comprising a stop lug fixed to the base plate and extending in a plane perpendicular to an axial direction of the cover plate.

7. The brush holder of claim 6, wherein the stop lug has two plane faces in an angled relation to an axial direction of the cover plate and wherein the two faces define an obtuse angle.

8. The brush holder of claim 6, wherein the stop lug is in a single piece with the base plate.

9. The brush holder of claim 6, wherein a band spring having two coiled ends and a median portion is secured to the stop lug for ensuring the return of the brush towards a commutator of a motor.

10. The brush holder of claim 9, wherein the cover plate comprises two lateral walls extending perpendicularly to the base plate and having cut outs extending from one axial end of the cover plate.

11. The brush holder of claim 10, wherein the cut outs of the two lateral walls receive the band spring.

12. The brush holder of claim 11, wherein the cover plate further comprises an upper wall extending perpendicular to the two lateral walls, the upper wall having a cut-out extending from a front axial end of the cover plate, wherein a connecting strand of the brush passes through the cut-out of the upper wall.

13. The case of claim 12, wherein each of the lateral walls has lower horizontal sides comprising two attachment lugs for securing the cover plate to base plate.

14. The brush holder of claim 1, wherein the cover plate comprises two lateral walls extending perpendicularly to the base plate and having cut-outs extending from one axial end of the cover plate.

15. The electric motor brush holder according to claim 1, wherein the cooling fin extends over an entire length of a folded side of the metal base plate.

16. The electric motor brush holder according to claim 1, wherein the metal base plate has an approximately rectangular shape.

17. A sub-assembly for an electric motor comprising:
a brush holder connectable to a support member;
a brush slidingly received in the brush holder; and
a band spring for the return of the brush towards a commutator of the motor,
wherein the brush holder has a cover plate and a metal base plate formed from a unitary metal sheet having at least one folded portion forming a cooling fin, the metal base and the cover plate defining a chamber for holding the brush and being formed by separate pieces, the cooling fin being a folded portion of the base plate not defining the chamber.

18. The subassembly according to claim 17, further comprising the support member having a central orifice configured to receive a commutator, the support member having arranged thereon at least one brush holder with the brush therein in slidable engagement with the commutator.

19. An electric motor for a motor vehicle, the motor comprising:
a brush; and
a brush holder connectable to a support member, the brush holder having a cover plate, and a metal base plate formed from a unitary metal sheet having at least one folded portion forming a cooling fin, the metal base plate and the cover plate defining a chamber for holding the brush and being formed by separate pieces, the cooling fin being a folded portion of the base plate not defining the chamber.

20. The electric motor according to claim 19, further comprising the support member having a central orifice configured to receive a commutator, the support member having arranged thereon at least one brush holder with the brush therein in slidable engagement with the commutator.

21. An electric motor brush holder connectable to a support member, the brush holder comprising:
a metal base plate formed from a unitary metal sheet having an edge portion folded to form a cooling fin; and
a cover plate, the metal base plate and the cover plate being separate pieces defining a housing for a brush.

* * * * *

UNITED STATES PATENT AND TRADEMARK OFFICE
CERTIFICATE OF CORRECTION

PATENT NO. : 6,229,242 B1
DATED : May 8, 2001,
INVENTOR(S) : Alain Autret et al.

It is certified that error appears in the above-identified patent and that said Letters Patent is hereby corrected as shown below:

Item [73], Assignee field, please change "d'Essuvage" to -- D'Essuyage --.

Signed and Sealed this

Fifteenth Day of January, 2002

Attest:

JAMES E. ROGAN
Director of the United States Patent and Trademark Office

Attesting Officer